(12) United States Patent
Le Rolland et al.

(10) Patent No.: US 8,226,762 B2
(45) Date of Patent: Jul. 24, 2012

(54) CEMENT COMPOSITION FOR A SELF-LEVELING FLUID SCREED, AND SELF-LEVELING FLUID SCREED THUS PRODUCED

(75) Inventors: Bruno Le Rolland, Oinville sur Montcient (FR); Andre Roux, Mantes la Jolie (FR); Sylvia Vespasien, Lognes (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 13/202,863

(22) PCT Filed: Mar. 18, 2010

(86) PCT No.: PCT/FR2010/050492
§ 371 (c)(1),
(2), (4) Date: Aug. 23, 2011

(87) PCT Pub. No.: WO2010/109116
PCT Pub. Date: Sep. 30, 2010

(65) Prior Publication Data
US 2012/0037046 A1 Feb. 16, 2012

(30) Foreign Application Priority Data
Mar. 23, 2009 (FR) .................................... 09 01327

(51) Int. Cl.
| C04B 28/04 | (2006.01) |
| C04B 28/06 | (2006.01) |
| C04B 11/30 | (2006.01) |
| C04B 111/62 | (2006.01) |
| C04B 111/34 | (2006.01) |

(52) U.S. Cl. ...................................... 106/695; 106/692

(58) Field of Classification Search .................. 106/692, 106/695
See application file for complete search history.

(56) References Cited

U.S. PATENT DOCUMENTS

| 5,114,487 A * | 5/1992 | Gartshore et al. ............ 106/695 |
| 6,695,910 B2 * | 2/2004 | Classen et al. ............... 106/739 |
| 7,326,478 B2 * | 2/2008 | Bouscal et al. ............... 428/703 |
| 2003/0183131 A1 * | 10/2003 | Classen et al. ............... 106/739 |
| 2005/0014034 A1 * | 1/2005 | Bouscal et al. ............... 428/703 |
| 2010/0330318 A1 * | 12/2010 | Alfani et al. ............... 428/36.91 |

FOREIGN PATENT DOCUMENTS

| DE | 16 71 201 A1 | 12/1969 |
| EP | 1 197 480 A1 | 4/2002 |
| EP | 1 258 466 A1 | 11/2002 |
| EP | 1 306 356 A1 | 5/2003 |
| EP | 1312590 A1 | 5/2003 |
| FR | 2825698 A1 | 12/2002 |
| FR | 2892116 A1 * | 4/2007 |
| WO | 94/29232 A1 | 12/1994 |

OTHER PUBLICATIONS

Derwent-Acc-No. 1992-041774, abstract of South Africa Patent Specification No. ZA 9008560A (Oct. 1990).*
Chemical Abstracts, vol. 86, No. 10, Mar. 7, 1977, abstract No. 59657y, G.V. Dolzhkova et al.: "Expanding cement, containing portland cement clinker, a sulfoaluminosilicate product, and gypsum" p. 296 XP184218.
International Search Reprot, dated Oct. 12, 2010, in Application No. PCT/FR2010/050492.

* cited by examiner

*Primary Examiner* — Anthony J Green
(74) *Attorney, Agent, or Firm* — Young & Thompson

(57) ABSTRACT

The self-leveling fluid screed cement composition with limited shrinkage, formed by a mixture of a cement binder, a fluidizing adjuvant, granulates and water, is characterized in that the binder includes 70% to 85% by weight of Portland cement, 7% to 18% by weight of sulfo-aluminous clinker, and 6% to 14% by weight of calcium sulfate, with a calcium sulfate C$/calcium sulfo-aluminate $C_4A_3$\$ molar ratio of between 5 and 7 and a water/binder ratio by weight of between 0.60 and 0.90. The self-leveling fluid screed that is thus produced has a mechanical resistance to its compression at 24 hours that is at least equal to 1 MPa, shrinkage at 7 days, measured under a relative hygrometry of 50%, less than 500 µm/m, and an endogenic expansion value that is measured at 7 days, less than 1,000 µm/m, as well as a very slight lifting of edges.

18 Claims, 4 Drawing Sheets

CEMENT COMPOSITION FOR A SELF-LEVELING FLUID SCREED, AND SELF-LEVELING FLUID SCREED THUS PRODUCED

FIELD OF THE INVENTION

This invention relates to the field of cement compositions used for the production of self-leveling fluid screeds, and more particularly a cement fluid composition for a screed and the self-leveling fluid screed thus produced.

BACKGROUND OF THE INVENTION

A self-leveling fluid screed is formed from a cement composition that is based on a binder, a granulate, which is generally sand, at least one fluidizing adjuvant (also called superplasticizer or dispersant) and water. The fluidizing adjuvant makes it possible to transform this cement composition into a paste whose consistency after mixing is close to that of water. This explains the self-leveling and self-smoothing nature of the composition in the fresh state.

Such screeds are highly prized in the construction and building field for their great ease of use, their ability to correct surface evenness defects of supports and to coat, for example, ducts of heating floors. They make it possible to obtain, without outside intervention, the perfect spreading of the mixture that is therefore done by gravity owing to the composition of the poured mixture.

The implementation of these screeds can be done on sites according to two methods:

The first method consists in manufacturing a "premix" in a mixing station, i.e., to implement the dry mixing of all of the components of the cement composition: binders and adjuvants, with granulates, so as to be able to use a powdered mixture of ready-to-use mortar. It is delivered to the site in movable silos or in bags. This mortar is designed to be mixed on site mechanically with water and applied by pumping;

The second method consists in manufacturing the fluid mortar in a concrete plant and in delivering to the site via a mixing truck. The mortar is then generally pumped on the site of use by means of a pump.

The different types of screeds are distinguished primarily by the nature of their binder.

The binders that are currently most used are natural or synthetic anhydrite (anhydrous calcium sulfate) that leads to the formation of gypsum after hydration, with the aluminous cement to which may or may not be added calcium sulfate that leads to the rapid formation of ettringite or Portland cement.

The so-called "anhydrite" screeds have the major drawback of being, after drying, very water-sensitive. Any rewetting of the screed by sweating from the support slab can give rise to serious disorders in the behavior of the ground covering. In addition, in drying, "anhydrite" screeds have protrusions of gypsum that crystallizes on the surface as well as protrusions of laitance (sweating that is manifested by an upwelling of water accompanied by fine elements of the formulation, such as limestone, gypsum). The surface formation of a skin that is not very resistant or powdered laitance restricts—before any placement of coating on said screed—operations of sanding, brushing or planing. Finally, the drying time of an anhydrite screed is generally slow. If the latter can be accelerated during the initial heating of a heating floor, in the absence of an internal heating system, the necessary drying time before coverage is approximately one month.

The use of aluminous cement, to which is generally added calcium sulfate, leads to the formation of ettringite after hydration. The resulting hardened screed is generally insensitive to water but in this case, the usable shelf life of the cement composition is rather short (less than 1 hour 30 minutes), making its use inadvisable in the case of transport by a cement mixer to the site from a concrete plant. The aluminous cement is then primarily used in the form of ready-to use "premix" and packaged in bags. It is mixed on site just before producing the screed.

The use of Portland cement by itself is generally preferable for producing a self-leveling fluid screed because it makes it possible to obtain a usable shelf life that is adequate for transporting and using the cement composition on site. In contrast, without the addition of specific adjuvants such as those described in, for example, the patent EP-B1-1,197,480, the hydration of Portland cement inevitably leads to the shrinkage phenomenon that gives rise to potential cracks, lifting of the edges of the screed, or warping and the subsequent formation of macrocracking under the action of its own weight. This pathology, also known as "curling," is linked to the shrinkage differential between the bottom and the surface of the screed, a differential caused by a moisture gradient that develops during drying.

A first object of the invention is therefore to propose a cement binder for a self-leveling fluid screed that makes it possible to obtain a cement composition that has a usable shelf life of more than approximately 1 hour 30 minutes, in particular for enabling its preparation in a concrete plant, exhibiting a rapid hardening, reflected by a mechanical resistance to compression at 24 hours that is at least equal to approximately 1 MPa so as to enable the continuation of work on the site the next day by making possible at least pedestrian traffic.

To combat the dimensional variations during hydration and drying phases, so-called expansive cements have been developed. These cements, according to the ACI (American Concrete Institute) Committee 223—*Standard Practice for the Use of Shrinkage-Compensating Concrete (ACI-223-98)*, are cements that, when they are mixed with water, produce a cement paste that, after setting, under moist curing conditions, tends to increase in volume. The expansion that is produced is capable of counterbalancing all or part of the shrinkage observed during exposure of the cement paste to an environment with reduced hygrometry and therefore obtaining cement compositions that have reduced dimensional variations. The expansive cement is thus described as a cement with shrinkage that is compensated to the extent that the residual expansion in the material remains limited and is even zero.

Furthermore, cement compositions with compensated shrinkage that are designed in such a way as to increase volume after setting and during the hardening phase at a young age are known. This expansion, when it is limited or restricted (by frames or simply a support or framework in the case of a slab), causes a compressive stress in the material. During subsequent drying, the shrinkage, instead of causing a traction stress that would lead to cracking, "releases" expansion deformations caused by the initial expansion.

Quicklime or magnesia is known as an expansive agent that makes it possible to compensate for shrinkage. As expansive binders, there are also expansive cements that lead to the controlled formation of etrringite in the first days that follow the installation of the concrete that make it possible to obtain a shrinkage-compensating effect. The three types of expansive cement that are recognized by the Standards ACI-223R6-93 and ASTM C 845-90 are as follows:

Type K: Contains $C_4A_3\$$, $C\$$, and non-combined lime (quicklime),

Type M: Contains calcium aluminates in CA and $C_{12}A_7$ form,

Type S: Contains a larger quantity of $C_3A$ than a Portland cement.

In a K-type expansive cement—the most frequently encountered one, in particular in the United States—the formation of ettringite from $C_4A_3\$$ is represented by the following equation:

$$C_4A_3\$ + 8C\$H_2 + 6CH + 74H \rightarrow 3C_6A\$_3H_{32}$$

The expansion of the cement paste that results from the formation of ettringite begins as soon as the water has been added, but the prevented expansion alone is beneficial, which is not the case as long as the concrete or mortar is in the plastic state. Furthermore, delayed expansion in a concrete can be dramatic when, for example, the latter undergoes an external attack by sulfates. It is therefore important that the formation of ettringite ceases after several days. During the use of this type of concrete, it is necessary to ensure curing with water, after pouring, a necessary condition for drawing full benefit from the use of such a cement. This limits the use of such cements to cement compositions that have a certain consistency. Consequently, until now, the case of self-leveling fluid cement compositions did not fall within the field of application of the cement compositions with compensated shrinkage.

Furthermore, the handling, or usability, of a cement composition that is manufactured with a K-type expansive cement is not as good, and the settling loss is greater than that observed with a traditional Portland cement. Taking into account the presence of quicklime in the K-type expansive cement, the kinetics of formation of the ettringite is quick and from the first moments leads to immobilizing a portion of the mixing water. This is reflected by a significant loss of usability over time.

A second object of this invention is to propose a binder for a self-leveling fluid screed with compensated shrinkage whose usable shelf life of the cement composition, implemented from this binder, can be controlled over an adequate period to make possible the use of said composition. Typically, this time is to easily reach 3 hours in the case of a delivery of the cement composition by mixing truck from the concrete plant (manufacturing site) to the work site (site of pouring the self-leveling fluid cement composition).

A third object of this invention is also to propose a cement composition that does not undergo a loss of fluidity over time: i.e., having a self-leveling nature from the time of its manufacturing until the time of its use at the site for making possible the casting of the screed.

SUMMARY OF THE INVENTION

For this purpose, the self-leveling fluid screed cement composition according to the invention, formed by a mixture of a cement binder, adjuvants that comprise at least one fluidizing adjuvant, granulates, and water, is characterized in that the cement binder comprises:

From 70% to 85% by weight of Portland cement,
From 7% to 18% by weight of sulfo-aluminous clinker containing a content of calcium sulfo-aluminate $C_4A_3\$$ of between 50 and 70% by weight,
From 6% to 14% by weight of calcium sulfate, with a calcium sulfate C$/calcium sulfo-aluminate $C_4A_3\$$ molar ratio of between 5 and 7, and in that the water/binder ratio by weight is between 0.60 and 0.90.

Preferably, the cement binder of the cement composition comprises:

From 77% to 85% by weight of Portland cement,
From 7% to 18% by weight of sulfo-aluminous clinker,
From 6% to 14% by weight of calcium sulfate.

The tests that are carried out have shown, surprisingly enough, that the essential condition for minimizing the shrinkage is to observe the above-mentioned molar ratio between the total calcium sulfate content, including the one that is present in the sulfo-aluminous clinker, and the calcium sulfo-aluminate content that is present in the sulfo-aluminous clinker.

Portland cement is defined as a cement that is standardized according to the European Standard EN 197-1 (of types I and II). In a preferred manner, Portland cement has a specific surface area (Blaine) of between 3,000 and 6,000 cm$^2$/g.

Sulfo-aluminous clinker is defined as any material that results from the firing at a temperature of between 900° C. and 1450° C. (clinkerization temperature) of mixtures that contain at least one source of lime (for example limestones that have a CaO content that varies between 50% and 60%), at least one alumina source (for example bauxites, calcined aluminas or another manufacturing sub-product that contains alumina), and at least one sulfate source (gypsums, chemical gypsum, natural or synthetic anhydrite, plaster, sulfo-calcic fly ash). The sulfo-aluminous clinker that is part of the binder of this invention contains a content of calcium sulfo-aluminate $4CaO.3Al_2O_3.SO_3$ (also referred to as $C_4A_3\$$) that is greater than 30% by weight, preferably between 50 and 70% by weight.

Advantageously, the sulfo-aluminous clinker that is used within the scope of the invention contains a free lime content that is less than or equal to 1% by weight, preferably less than 0.6% by weight. A content that is greater than 1% of free lime can give rise to problems of rapid usability loss of the cement composition.

Calcium sulfate can be selected from among anhydrite, gypsum, or calcium hemihydrate.

In this composition, the binder is diluted with water according to a water/binder ratio by weight that is advantageously between 0.60 and 0.80, preferably between 0.70 and 0.80.

In a preferred manner, the granulate is sand, advantageously with a grain size that is less than or equal to 4 mm.

The cement composition according to the invention can contain one or more adjuvants that are selected from among: a setting retardant, such as a polycarboxylic acid, a hardening accelerator, a cohesion and stability agent, an anti-foaming agent, and a superplasticizer. The hardening accelerator is advantageously an alkaline salt, preferably selected from among lithium carbonate, sodium carbonate, or a mixture of the latter.

Said composition preferably has a usable shelf life (measured according to the ASTM Standard C230/C230 M-03) of between 1 hour 30 minutes and 3 hours, at a temperature of between 5° C. and 30° C.

This invention also relates to the use of the cement composition described above for the production of a self-leveling fluid screed.

The self-leveling screed that is obtained from the composition described above has performance levels that are higher than the screeds of the prior art and is in particular characterized in that it has a mechanical resistance to compression at 24 hours that is at least equal to 1 MPa, a shrinkage at 7 days, measured under a relative hygrometry of 50%, less than 500 μm/m, and an endogenous inflation value that is measured at 7 days, less than 1,000 μm/m. Observation of these values makes it possible to obtain a so-called "good dimensional stability" screed and therefore with limited shrinkage, to the extent that it is noted that no crack appears until 28 days after its implementation.

Table 1 below makes it possible to compare and to "quantify" the observed performance for the self-leveling fluid screed according to the invention relative to the performance of the screeds of the prior art.

TABLE 1

| PROPERTY | ANHYDRITE SCREED | PORTLAND CEMENT SCREED | ALUMINOUS CEMENT SCREED | SULFO-ALUMINOUS CEMENT SCREED | SCREED ACCORDING TO THE INVENTION |
|---|---|---|---|---|---|
| Elevated Mechanical Resistance at 1 Day | + | − | + | + | + |
| Long Usable Shelf Life | + | + | − | − | + |
| Dimensional Stability under Reduced Hygrometry (R.H. = 50%) | + | − | + | + | + |
| Dimensional Stability in a Wet Environment | − | + | − | − | + |
| Elevated Drying Time | − | + | + | + | + |
| Absence of Sanding | − | + | + | + | + |
| NUMBER OF "+" | 3 | 4 | 4 | 4 | 6 |

BRIEF DESCRIPTION OF THE DRAWINGS

Other characteristics and advantages of the invention will emerge from the following description of different embodiments provided by way of nonlimiting examples that are presented with reference to the accompanying figures, in which.

DETAILED DESCRIPTION OF THE INVENTION

Examples

1/ Preparation of the Cement Composition in a Laboratory

Two laboratory mixing protocols are used according to which the cement composition is intended to be used in the form of a ready-to-use premix or in the form of mortar to be manufactured in a concrete plant.

In the first case, the dry cement composition that comprises the cement binder, the adjuvants and the sand is first homogenized in a Turbula-type mixer for 5 minutes before being mixed in a laboratory mixer.

In the second case, the cement composition without sand is first homogenized in a Turbula-type mixer for 5 minutes. It is at the time of mixing that the sand is first wetted and that the liquid superplasticizer is added.

2/ Tested Parameters

Figure 1A:
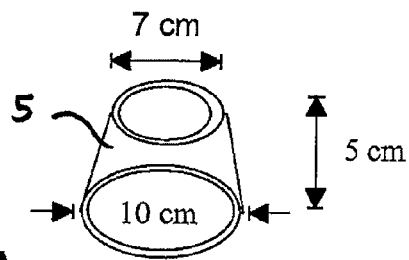
FIGS. 1A, 1B and 1C show diagrams of the measurement of the spread of the cement composition according to the ASTM Standard.
Figure 1B:
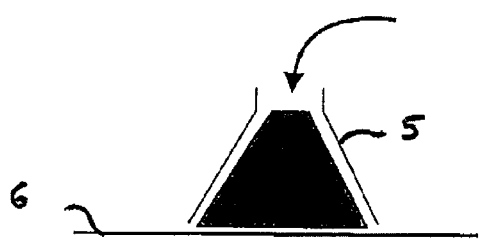
Figure 1C:
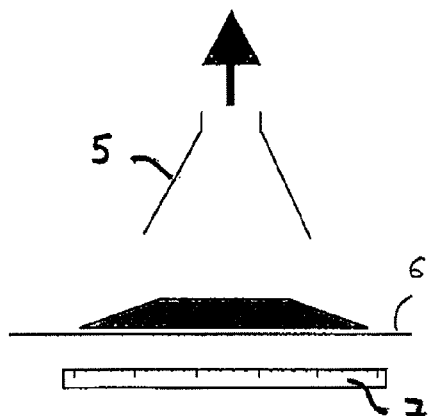

The parameters of the tested fluid mortars are as follows:

Measurement of the spread: The degree of fluidity of the tested mortar is evaluated by the measurement of the spread that is obtained after manual lifting of a cone filled with the cement composition. The dimensions of the cone 5 that is used, shown in a diagram in FIG. 1A, are $\emptyset\text{sup.} \times h \times \emptyset\text{inf.} = 7 \times 5 \times 10$ cm$^3$ (ASTM cone). The cone 5 is filled with the cement composition that is to be tested (FIG. 1B), and then it is raised as vertically as possible (FIG. 1C). The value of the spread over the surface 6, corresponding to the mean of three measurements of diameter made using a caliper gauge 7, is to be between 220 and 300 mm so that the cement composition is considered to be fluid and self-leveling. In the examples according to this invention, the minimum value of 230 mm, preferably 250 mm, will be adopted.

Changes of the spread over time: Measurements of spread over the self-leveling cement composition are made up to a period of 3 hours after the beginning of the mixing. Between each measuring period, the tested cement composition is left at rest and covered by a wet cloth. After each measurement of the spread, the cement composition is remixed for 15 seconds.

Figure 2:
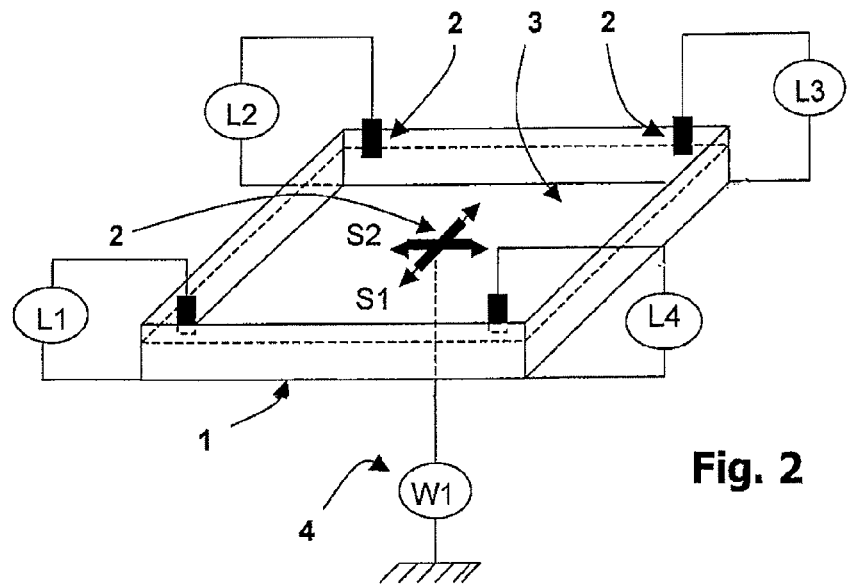
FIG. 2 presents the "curlingmeter," a device for measuring dimensional variations of a screed.

Lifting of the edges during drying ("curling"): The lifting of the edges or "curling" is measured with a laboratory device in accordance with FIG. 2. The cement composition is poured along arrow 3 in a mold 1 in a square shape 33 cm on a side and 3 cm high. Metal inserts 2 are held by a gabarite for the first 24 hours. At the end of 24 hours, two movement sensors that measure the shrinkage (S1 and S2) and four movement sensors (L1, L2, L3 and L4) that measure the lifting of the edges are attached to these inserts. A spring balance 4 makes it possible also to track the changes in the weight from the time when the cement composition was poured into the mold. All of the data relative to the values of movement of the sensors as well as the weight are recorded continuously over time with a frequency that it is possible to select (typically a measurement every hour). The device is placed in an environmental box at 20° C. and 50% relative humidity (R.H.). Such a device makes it possible to produce—on the laboratory scale—the behavior of a screed and to measure its curling, shrinkage and changes in weight under severe drying conditions.

Shrinkage/expansion measurements: the measurements of shrinkage and expansion are carried out on specimens of hardened mortar. After preparing the cement composition according to the mixing protocol described above, the latter is introduced into metal molds with dimensions of 4×4×16 cm³. The molds are kept for 24 hours in an environmental chamber at 20° C. under conditions of relative humidity (R.H.) that are greater than 95%. At the end of 24 hours, the specimens are demolded and placed in different tested environments: at 20° C. and 50% relative humidity, at 20° C. in water, and at 20° C. under endogenic conditions (specimens encased in aluminum). The first measurement of shrinkage takes place at 24 hours. The changes in the dimensions of the specimens are measured using a comparator up to a period of at least 28 days in the different tested environments. The positive "shrinkage" values correspond to an expansion, and the negative values correspond to a reduction of the dimension of specimens (effective shrinkage).

Measurements of setting times: The measurements of setting times are carried out using the Vicat needle directly on the cement composition that is being studied, comprising sand. Unlike what is done on pure paste according to Standard EN 196-3, the setting start times are produced here by using a weight of 700 g instead of 300 g (applied on the measuring head of the indentation). Furthermore, taking into account the self-leveling nature of the cement composition, the latter is not immersed in water at the time of the measurement. In addition to these two modifications, the setting start and end times are measured in the same way as in Standard EN 196-3 using the Vicat needle.

Measurements of mechanical performance: mechanical performance (compressive strength Rc and bending strength Rf) is evaluated on hardened specimens of the cement composition that is being studied with periods of 24 hours, 7 days, and 28 days. As appropriate, several preservation modes have been produced: at 20° C. in water, at 20° C. in air (relative humidity on the order of 65%), under ambient conditions for the implementation of industrial tests. In all of the cases, the specimens are demolded at the end of 24 hours before curing in the selected preservation mode.

Components of the cement binder:

The Portland cement that is used is a CEM I- or CEM II-type Portland cement.

The sulfo-aluminous clinker that is used in the examples below exhibits a $C_4A_3\$$ content of between 55 and 65% by weight, a calcium sulfate $C\$$ content of between 7 and 11% by weight, a $C_2S$ content of between 17 and 22% by weight, and a content of free lime that is close to 0.3% by weight.

The calcium sulfate that is added is anhydrite here.

Adjuvants: the various cement compositions that are presented below may contain the following adjuvant or additives, conventionally used for the aluminous or sulfo-aluminous cements:

Setting retardant: polycarboxylic acids or polycarboxylic acid salts, for example citric acid in monohydric form, Hardening accelerator: alkaline salts, more particularly lithium salts, such as lithium carbonate $Li_2CO_3$, or sodium carbonate $Na_2CO_3$.

Cimfluid P2: superplasticizer made of polycarboxylate-type powder (marketed by the Axim Company), Collaxim P5 (Axim): agent for cohesion and stability, making it possible to prevent segregation and sweating phenomena, Desaerocim P1 (Axim): anti-foaming agent that makes it possible to prevent driving air into the cement composition.

In all of the following examples, the contents of the different components are expressed in parts by weight, and the percentages of the components of the binder relate to the percentage by weight relative to the total weight of the binder.

Example 1

This Example 1 shows that if the Portland cement content is greater than 85% (comparative screed 1 and comparative screed 2), then the mechanical performances of the screed do not allow pedestrian traffic on the screed because the resistance to compression is too low: Rc (1 day)<1 MPa. All of the formulations that are presented in Table 2 were optimized so as to obtain a usable shelf life of at least 3 hours.

TABLE 2

|  | Comparative SCREED 1 | Comparative SCREED 2 | SCREED 3 |
|---|---|---|---|
| CEM II/B-LL 32.5 R | 427.5 | 415 | 380 |
| SULFO-ALUMINOUS CLINKER | 11.25 (2.5%) | 14.8 (3.3%) | 41 (9.1%) |
| ANHYDRITE | 11.25 (2.5%) | 20.2 (4.5%) | 29 (6.5%) |
| $Li_2CO_3$ | 0.3 | 0.3 | 0.3 |
| Cimfluid P2 | 1.5 | 2.5 | 3 |
| Sand 0/0.5 mm | 828 | 828 | 828 |
| Sand 0.5/1.25 mm | 359 | 359 | 359 |
| Sand 1.25/4 mm | 193 | 193 | 193 |
| Citric Acid | 3 | 2.5 | 3 |
| Collaxim P5 | 0.08 | 0.2 | 0.2 |
| Desaerocim P1 | 2 | 1 | 1 |
| Water (Water/Binder Ratio by Weight) | 330 (0.73) | 330 (0.73) | 330 (0.73) |
| Spread t 0 | 264 | 261 | 261 |
| Spread (t = 30 min) | 267 | 258 | 264 |
| Spread (t = 60 min) | 268 | 257 | 268 |
| Spread (t = 90 min) | 261 | 252 | 257 |
| Spread (t = 120 min) | 262 | 237 | 255 |
| Spread (t = 150 min) | 254 | 252 | 256 |
| Spread (t = 180 min) | 249 | 231 | 257 |
| PORTLAND CEMENT CONTENT | 95% | 92.2% | 84.4% |
| $C\$/C_4A_3\$$ (Molar) | 7.30 | 9.67 | 5.40 |
| Rf (1 day) (MPa) | 0.2 ± 0.1 | 0.2 ± 0.1 | 1.9 ± 0.1 |
| Rc (1 day) (MPa) | 0.5 ± 0.1 | 0.5 ± 0.1 | 5.6 ± 0.1 |

Rf = Bending Strength
Rc = Compressive Strength

Example 2

In this Example 2, all of the formulations presented in Table 3 were also optimized so as to obtain a useable shelf life of at least 3 hours.

TABLE 3

| | Comparative SCREED 4 | Comparative SCREED 5 | Comparative SCREED 6 | SCREED 3 |
|---|---|---|---|---|
| CEM II/B-LL 32.5 R | 380 | 380 | 400 | 380 |
| SULFO-ALUMINOUS CLINKER | 29 (6.5%) | 35 (7.8%) | 25 (5.55%) | 41 (9.1%) |
| ANHYDRITE | 41 (9.1%) | 35 (7.8%) | 25 (5.55%) | 29 (6.5%) |
| $Li_2CO_3$ | 0.3 | 0.3 | 0.3 | 0.3 |
| Cimfluid P2 | 2.5 | 3 | 3 | 3 |
| Sand 0/0.5 mm | 828 | 828 | 828 | 828 |
| Sand 0.5/1.25 mm | 359 | 359 | 359 | 359 |
| Sand 1.25/4 mm | 193 | 193 | 193 | 193 |
| Citric Acid | 2.5 | 3 | 2.5 | 3 |
| Collaxim P5 | 0.2 | 0.2 | 0.2 | 0.2 |
| Desaerocim P1 | 1 | 1 | 1 | 1 |
| Water (Water/Binder Ratio) | 330 (0.73) | 330 (0.73) | 330 (0.73) | 330 (0.73) |
| Spread t 0 | 269 | 260 | 261 | 261 |
| Spread (t = 30 min) | 265 | 264 | 256 | 264 |
| Spread (t = 60 min) | 263 | 266 | 255 | 268 |
| Spread (t = 90 min) | 263 | 270 | 246 | 257 |
| Spread (t = 120 min) | 252 | 262 | 242 | 255 |
| Spread (t = 150 min) | 252 | 252 | 245 | 256 |
| Spread (t = 180 min) | 244 | 256 | 243 | 257 |
| PORTLAND CEMENT CONTENT | 84.4% | 84.4% | 88.9% | 84.4% |
| $C\$/C_4A_3\$$ (Molar) | 9.98 | 7.30 | 7.30 | 5.40 |
| Rf (1 day) (MPa) | 0.5 ± 0.1 | 1.9 ± 0.2 | 0.5 ± 0.1 | 1.9 ± 0.1 |
| Rc (1 day) (MPa) | 1.2 ± 0.1 | 5.0 ± 0.1 | 1.0 ± 0.1 | 5.6 ± 0.1 |
| Expansion in Water (7 Days) (G in μm/m) | +6,277 | +2,267 | +4,713 | +347 |
| Shrinkage: 50% R.H. (7 Days) (R in μm/m) | — | −130 | +630 | −413 |
| Dimensional Amplitude (G-R in μm/m) | — | +2,397 | +4,083 | +760 |

The results of this Table 3 demonstrate the influence of the $C\$/C_4A_3\$$ molar ratio on the dimensional stability of the mortar, with an identical Portland cement content. A ratio that is equal to 5.4 makes it possible to optimize the dimensional amplitude whereas if this ratio is greater than 7.3, an excessive expansion in water (i.e., under RH=100%) is observed. In the case of the screed 5, the measured shrinkage values are as low as possible and could allow us to conclude that this formulation provides the best performance. This is especially so since during the casting of such a screed, it is unlikely that it is immersed in water and therefore able to cause an incompatible expansion (+2,267 μm/m). However, the endogenic shrinkage that is measured on such a screed actually corresponds to a great expansion as Table 4 below shows. If it is accepted that endogenic-type behavior can occur at the bottom of the screed, this high value is completely inconsistent.

TABLE 4

| | Comparative SCREED 5B | SCREED 3B |
|---|---|---|
| CEM II/B-LL 32.5 R | 380 | 380 |
| SULFO-ALUMINOUS CLINKER | 35 (7.8%) | 41 (9.1%) |
| ANHYDRITE | 35 (7.8%) | 29 (6.5%) |
| $Li_2CO_3$ | 0.3 | 0.3 |
| Cimfluid P2 | 3 | 3 |
| Sand 0/0.5 mm | 828 | 828 |
| Sand 0.5/1.25 mm | 359 | 359 |
| Sand 1.25/4 mm | 193 | 193 |
| Citric Acid | 3 | 3 |
| Collaxim P5 | 0.2 | 0.2 |
| Desaerocim P1 | 1 | 1 |
| Water (Water/Binder Ratio by Weight) | 330 (0.73) | 330 (0.73) |
| PORTLAND CEMENT CONTENT | 84.4% | 84.4% |
| $C\$/C_4A_3\$$ (Molar) | 7.30 | 5.40 |
| Endogenic Shrinkage (7 Days) (RE in μm/m) | +3,173 | +430 |

The screeds 5B and 3B presented in Table 4 are screeds with compositions that correspond respectively to the compositions of the screeds 5 and 3 that are produced in a laboratory, which have been cast at an industrial site on a surface area of 15 m² and a height of between 4 and 8 cm. From 7 days, cracks are observed on the screed 5B that is not yet immersed in water, whereas the screed 3B does not have this type of defect. An endogenic shrinkage limit value makes it possible to avoid any cracking problem. This shrinkage limit value that is in fact expansion has been set at +1000 μm/m at 7 days.

Example 3

In this Example 3, the two formulations that are presented in Table 5 below are also optimized so as to obtain a usable shelf life of at least 3 hours.

TABLE 5

| | Comparative SCREED 7 | SCREED 8 | SCREED 3 |
|---|---|---|---|
| CEM II/B-LL 32.5 R (Vicat) | 360 | 360 | 380 |
| SULFO-ALUMINOUS CLINKER | 65.3 (14.5%) | 46.5 (10.3%) | 41 (9.1%) |
| ANHYDRITE | 24.7 (5.5%) | 43.5 (9.7%) | 29 (6.5%) |
| $Li_2CO_3$ | 0.3 | 0.3 | 0.3 |
| Cimfluid P2 | 1.5 | 2.5 | 3 |
| Sand 0/0.5 mm | 828 | 828 | 828 |
| Sand 0.5/1.25 mm | 359 | 359 | 359 |
| Sand 1.25/4 mm | 193 | 193 | 193 |
| Citric Acid | 3.5 | 3 | 3 |
| Collaxim P5 | 0.08 | 0.2 | 0.2 |
| Desaerocim P1 | 2 | 1 | 1 |
| Water (Water/Binder Ratio by Weight) | 330 (0.73) | 330 (0.73) | 330 (0.73) |
| Spread t 0 | 269 | 266 | 261 |
| Spread (t = 30 min) | 273 | 272 | 264 |
| Spread (t = 60 min) | 266 | 265 | 268 |
| Spread (t = 90 min) | 262 | 257 | 257 |
| Spread (t = 120 min) | 264 | 251 | 255 |
| Spread (t = 150 min) | 256 | 248 | 256 |
| Spread (t = 180 min) | 245 | 243 | 257 |
| Rf (1 day) (MPa) | 2.3 ± 0.2 | 2.4 ± 0.1 | 1.9 ± 0.1 |
| Rc (1 day) (MPa) | 6.1 ± 0.1 | 7.6 ± 0.1 | 5.6 ± 0.1 |
| PORTLAND CEMENT CONTENT | 80% | 80% | 84.4% |
| $C\$/C_4A_3\$$ (Molar) | 3.27 | 6.88 | 5.40 |
| Expansion (7 Days) (G in μm/m) | +50 | +1,320 | +347 |

TABLE 5-continued

|  | Comparative SCREED 7 | SCREED 8 | SCREED 3 |
|---|---|---|---|
| Shrinkage (7 Days) (R in μm/m) | −705 | −333 | −413 |
| Dimensional Amplitude (7 Days) (G-R in μm/m) | +755 | +1,653 | +760 |

With the primary parameter being shrinkage, the screeds 8 and 3 are suitable for the application, unlike the screed 7 that has excessive shrinkage. The endogenic shrinkage values (corresponding in fact to expansion) that are less than 1,000 μm/m make it possible to produce a self-leveling fluid cement screed for 3 hours that is then free of cracking over time (see Table 6 below). The screeds 8B and 3B correspond to the cement compositions of the screeds 8 and 3 of Table 5, cast at the industrial site over a surface area of 15 m² using a mixer/pump.

TABLE 6

|  | SCREED 8B | SCREED 3B |
|---|---|---|
| CEM II/B-LL 32.5 R | 360 | 380 |
| SULFO-ALUMINOUS CLINKER | 46.5 (10.3%) | 41 (9.1%) |
| ANHYDRITE | 43.5 (9.7%) | 29 (6.5%) |
| $Li_2CO_3$ | 0.3 | 0.3 |
| Cimfluid P2 | 2.5 | 3 |
| Sand 0/0.5 mm | 828 | 828 |
| Sand 0.5/1.25 mm | 359 | 359 |
| Sand 1.25/4 mm | 193 | 193 |
| Citric Acid | 3 | 3 |
| Collaxim P5 | 0.2 | 0.2 |
| Desaerocim P1 | 1 | 1 |
| Water (Water/Binder Ratio by Weight) | 330 (0.73) | 330 (0.73) |
| PORTLAND CEMENT CONTENT | 80% | 84.4% |
| $C\$/C_4A_3\$$ (Molar) | 6.88 | 5.40 |
| Endogenic Shrinkage (7 Days) (RE in μm/m) | +927 | +430 |

Taking into account the set of results above, it is demonstrated that, surprisingly enough, the $C\$/C_4A_3\$$ molar ratio is to be between 5 and 7 to make possible the production of a self-leveling fluid screed for 3 hours, free of cracking, a result of a controlled shrinkage and expansion.

Example 4

Example 4 shows that with Portland cement contents as low as 70% by weight in the cement binder, it is possible to obtain a screed having a good dimensional stability.

TABLE 7

|  | SCREED 9 | SCREED 10 |
|---|---|---|
| CEM II/B-LL 32.5 R | 315 | 315 |
| SULFO-ALUMINOUS CLINKER | 81 (18%) | 72 (16%) |
| ANHYDRITE | 54 (12%) | 63 (14%) |
| $Li_2CO_3$ | 0.3 | 0.3 |
| Cimfluid P2 | 2.5 | 2.5 |
| Sand 0/0.5 mm | 828 | 828 |
| Sand 0.5/1.25 mm | 359 | 359 |
| Sand 1.25/4 mm | 193 | 193 |
| Citric Acid | 3.5 | 3.5 |
| Collaxim P5 | 0.2 | 0.2 |
| Desaerocim P1 | 1 | 1 |
| Water (Water/Binder Ratio by Weight) | 330 (0.73) | 330 (0.73) |

TABLE 7-continued

|  | SCREED 9 | SCREED 10 |
|---|---|---|
| PORTLAND CEMENT CONTENT | 70% | 70% |
| $C\$/C_4A_3\$$ (Molar) | 5.14 | 6.49 |
| Shrinkage (7 Days) (R in μm/m) | −320 | −210 |
| Endogenic Shrinkage (7 Days) (RE in μm/m) | +520 | +982 |

However, a lower Portland cement content restricts the use of higher quantities of sulfo-aluminous cement, which leads to a higher cost. Furthermore, an increase in the content of sulfo-aluminous clinker makes it more difficult to monitor the usable shelf life of 3 hours during which the mortar is to remain self-leveling.

Example 5

Example 5 shows that Portland cement can be selected just as well from among the CEM I- and CEM II-type Portland cements.

TABLE 8

| MATERIALS | SCREED 11 | SCREED 12 | SCREED 13 |
|---|---|---|---|
| CEM I 52.5 N | 380 g | — | — |
| CEM II/A-LL 42.5 N | — | 380 g | — |
| CEM II/B-M (S-LL) 32.5 R | — | — | 380 g |
| Sulfo-Aluminous Clinker | 41 g | 41 g | 41 g |
| Anhydrite SMA | 29 g | 29 g | 29 g |
| $Li_2CO_3$ | 0.3 g | 0.3 g | 0.3 g |
| Citric Acid | 2.5 g | 3 g | 2.5 g |
| Collaxim P5 | 0.2 g | 0.2 g | 0.2 g |
| Desaerocim P1 | 1 g | 1 g | 1 g |
| Sand 0/4 mm | 1,380 g | — | — |
| Sand 0/2 mm R | — | 1,380 g | — |
| Sand 0/0.5 mm | — | — | 828 g |
| Sand 0.5/1.25 mm | — | — | 359 g |
| Sand 1.25/4 mm | — | — | 193 g |
| Cimfluid 2002 | 9.5 g | — | — |
| Optima 100 | — | 7.5 g | — |
| Cimfluid P2 | — | — | 2.5 g |
| Water (Water/Binder Ratio) | 354 g (0.79) | 325 g (0.72) | 330 g (0.73) |
| Portland Cement Content | 84.4% | 84.4% | 84.4% |
| $C\$/C_4A_3\$$ (Molar) | 5.40 | 5.40 | 5.40 |
| Spread t 0 | 268 | 267 | 263 |
| Spread (t = 30 min) | 269 | 275 | 260 |
| Spread (t = 60 min) | 266 | 272 | 259 |
| Spread (t = 90 min) | 258 | 266 | 254 |
| Spread (t = 120 min) | 255 | 258 | — |
| Spread (t = 150 min) | 253 | 253 | — |
| Spread (t = 180 min) | 249 | 249 | — |
| Rc (1 day) (MPa) | 4.1 | 3.8 | 3.9 |
| Endogenic Shrinkage (7 Days) (RE in μm/m) | −2.0 | +53.0 | −2.7 |
| Shrinkage 50% R.H. (7 Days) (R in μm/m) | −39.7 | −126.7 | −45.0 |

As the results of Table 8 above show, the shrinkage values (whether it is endogenic shrinkage or shrinkage from drying under a hygrometry of 50%) measured on 3 screeds are very low.

Example 6

Figure 3:
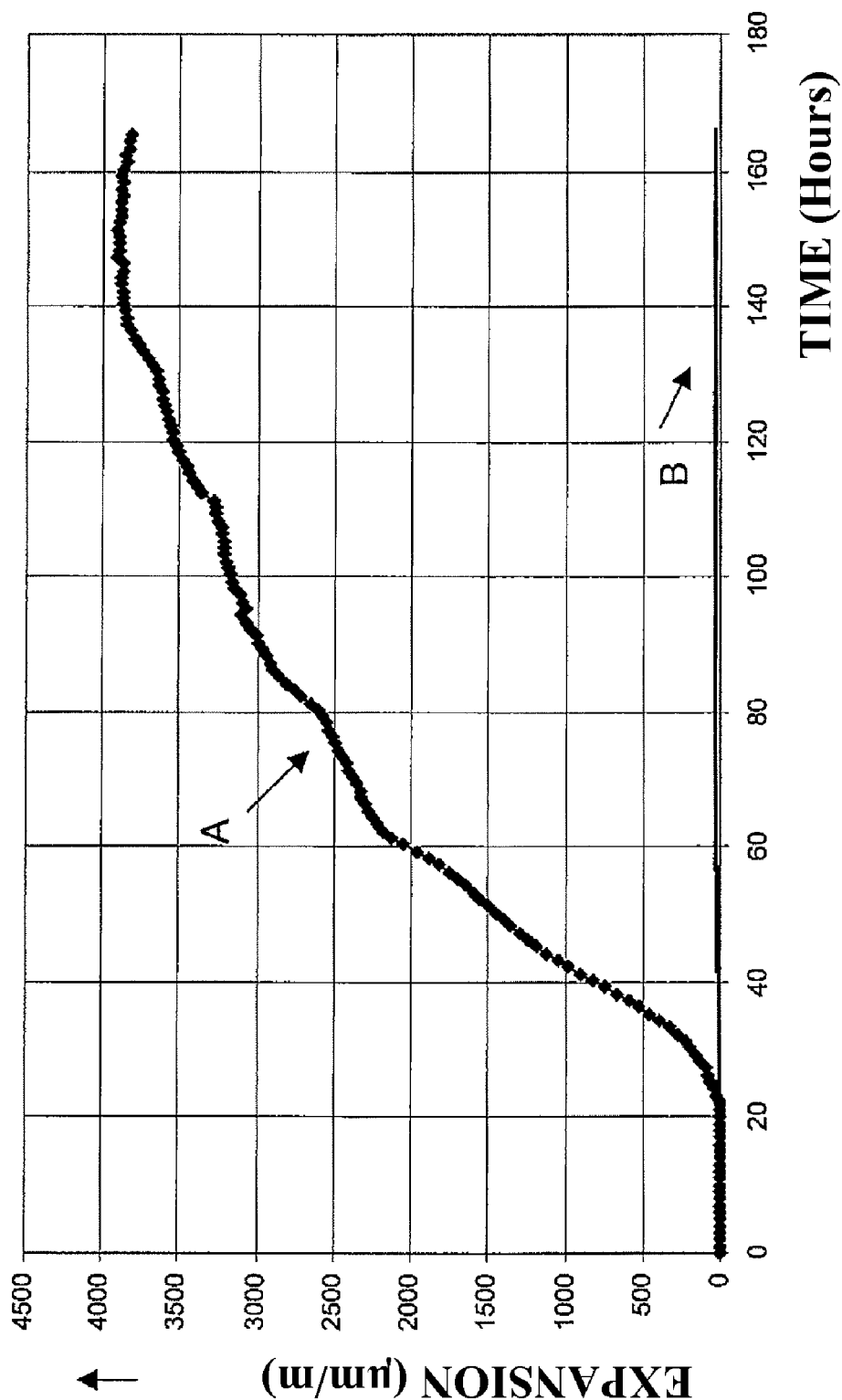
FIG. 3 is a graph that shows the dimensional variations over time of a screed of the prior art.
Figure 4:
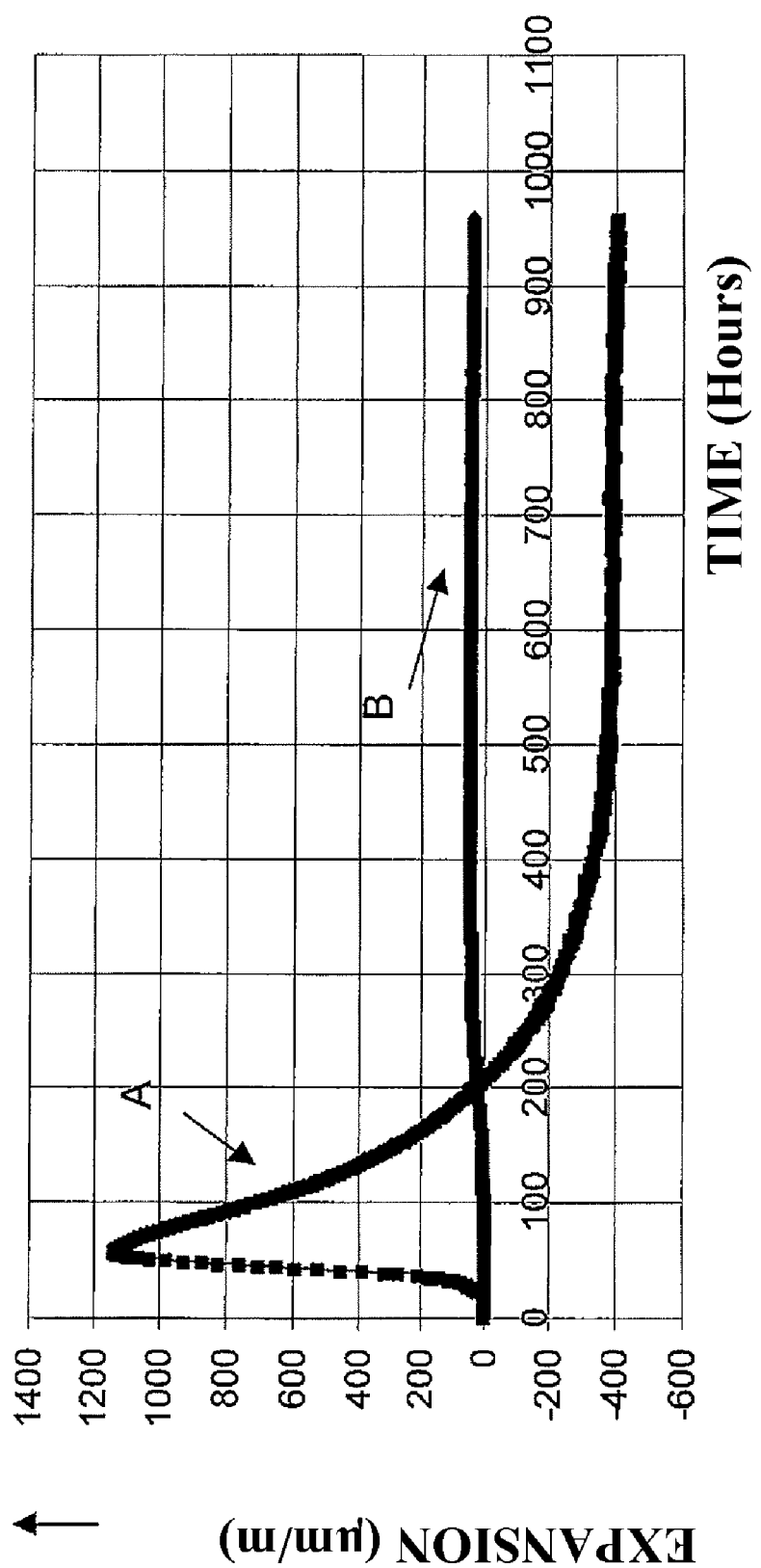
FIGS. 4 and 5 are graphs that show the dimensional variations over time of screeds in accordance with this invention.
Figure 5:
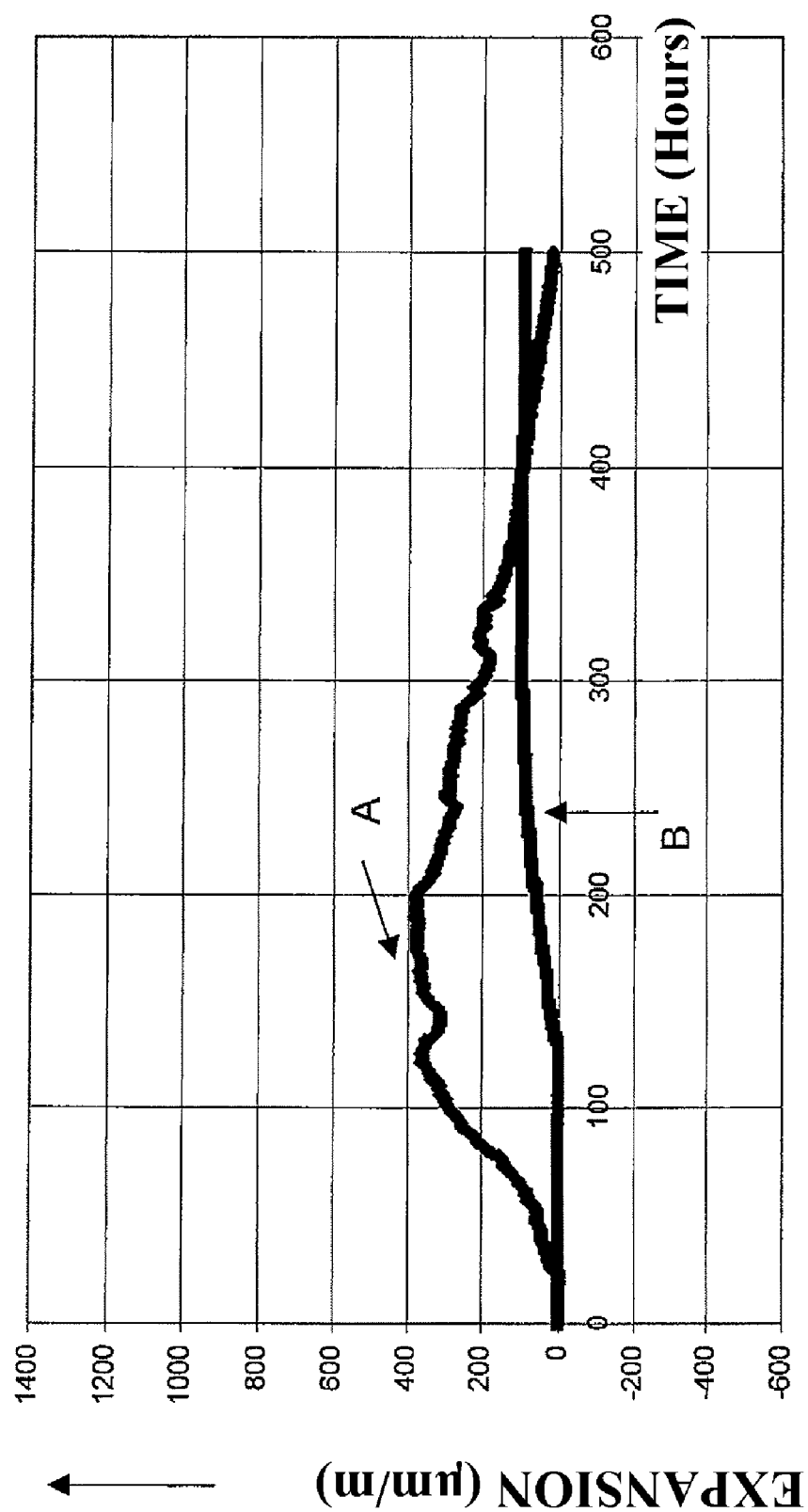

Example 6 consolidates the results of measurements of dimensional variations A and a lifting of edges B based on time that are carried out continuously using a "curlingmeter" on three screeds of different compositions: namely, the comparative screed 5 and the screeds 8 and 12 that fall within the scope of the invention, presented respectively in the accompanying FIGS. 3, 4 and 5.

It is noted in FIG. 3 that the comparative screed 5 has excessive expansion and leads to the appearance of cracks by expansion.

Among the two screeds according to the invention, it appears (see FIGS. 4 and 5) that the screed 12 is particularly efficient: the shrinkage compensation is achieved by a preliminary expansion that compensates exactly for the shrinkage at the end of 500 hours (approximately 21 days). The screed remains expanded, unlike the screed 8.

The invention claimed is:

1. A self-leveling fluid screed cement composition formed by a mixture of a cement binder, adjuvants comprising at least one fluidizing adjuvant, granulates and water, wherein, the cement binder comprises:
    70% to 85% by weight of Portland cement,
    7% to 18% by weight of sulfo-aluminous clinker containing a content of calcium sulfo-aluminate $C_4A_3\$$ of between 50% and 70% by weight, and
    6% to 14% by weight of calcium sulfate,
    a calcium sulfate $C\$$/calcium sulfo-aluminate $C_4A_3\$$ molar ratio is between 5 and 7, and
    a water/binder ratio by weight is between 0.60 and 0.90.

2. The cement composition according to claim 1, wherein the cement binder comprises:
    77% to 85% by weight of the Portland cement,
    7% to 18% by weight of the sulfo-aluminous clinker, and
    6% to 14% by weight of the calcium sulfate.

3. The cement composition according to claim 1, wherein the water/binder ratio by weight is between 0.60 and 0.80.

4. The cement composition according to claim 1, wherein the sulfo-aluminous clinker contains a free lime content of less than or equal to 1% by weight.

5. The cement composition according to claim 1, wherein the calcium sulfate is anhydrite, gypsum, or calcium hemihydrate.

6. The cement composition according to claim 1, wherein the granulate is sand with a grain size of less than or equal to 4 mm.

7. The cement composition according to claim 1, comprising one or more adjuvants selected from the group consisting of: a setting retardant, a hardening accelerator, a cohesion and stability agent, an anti-foaming agent, and a superplasticizer.

8. The cement composition according to claim 7, wherein the hardening accelerator is an alkaline salt.

9. The cement composition according to claim 1, wherein the composition has a usable shelf life, according to Standard ASTM C230/C230, M-03 of between 1 hour 30 minutes and 3 hours, at a temperature of between 5° C. and 30° C.

10. The cement composition according to claim 2, wherein the water/binder ratio by weight is between 0.60 and 0.80.

11. The cement composition according to claim 4, wherein the free lime content is less than or equal to 0.6% by weight.

12. The cement composition according to claim 7, wherein the setting retardant is polycarboxylic acid.

13. The cement composition according to claim 8, wherein the alkaline salt is lithium carbonate, sodium carbonate, or a mixture thereof.

14. A self-leveling screed obtained from the cement composition according to claim 1, wherein the screed:
    has a mechanical resistance to compression at 24 hours greater than or equal to 1 MPa,
    shrinkage at 7 days, measured under a relative hygrometry of 50%, of less than 500 μm/m, and
    an endogenic expansion value, measured at 7 days, of less than 1,000 μm/m.

15. A cement binder, comprising:
    70% to 85% by weight of Portland cement,
    7% to 18% by weight of sulfo-aluminous clinker containing a content of calcium sulfo-aluminate $C_4A_3\$$ of between 50% and 70% by weight, and
    6% to 14% by weight of calcium sulfate,
    wherein, a calcium sulfate $C\$$/calcium sulfo-aluminate $C_4A_3\$$ molar ratio is between 5 and 7.

16. The cement binder according to claim 15, comprising:
    77% to 85% by weight of the Portland cement,
    7% to 18% by weight of the sulfo-aluminous clinker, and
    6% to 14% by weight of the calcium sulfate.

17. The cement binder according to claim 15, wherein the sulfo-aluminous clinker contains a free lime content of less than or equal to 1% by weight.

18. The cement binder according to claim 15, wherein the sulfo-aluminous clinker contains a free lime content of less than or equal to 0.6% by weight.

* * * * *